United States Patent [19]

Marsh

[11] 4,068,423
[45] Jan. 17, 1978

[54] SIMPLIFIED GREENHOUSE STRUCTURE SUITABLE FOR MASS PRODUCTION AND FIELD ASSEMBLY

[76] Inventor: Edwin R. Marsh, 2523 1/2 Tacoma Ave., Tacoma, Wash. 98402

[21] Appl. No.: 584,720

[22] Filed: Mar. 1, 1976

[51] Int. Cl.$^2$ ............................................... E04B 1/32
[52] U.S. Cl. ........................................ 52/86; 47/17; 135/3 R
[58] Field of Search .................. 47/17, 18, 19, 26–32; 52/86, 66; 135/3 R

[56] References Cited

U.S. PATENT DOCUMENTS

| | | | |
|---|---|---|---|
| 1,244,576 | 10/1917 | Arnold | 47/27 |
| 2,801,716 | 8/1957 | Colby | 52/86 |
| 2,823,683 | 2/1958 | Smith | 135/3 R |
| 2,988,810 | 6/1961 | Wilken | 52/86 |
| 3,009,211 | 11/1961 | Hansen | 52/66 |
| 3,057,119 | 10/1962 | Kessler | 52/86 |
| 3,081,579 | 3/1963 | Pelley | 52/86 |
| 3,095,670 | 7/1963 | Raab | 47/17 |
| 3,165,110 | 1/1965 | Brooks | 135/3 R |
| 3,203,143 | 8/1965 | Swenson | 47/28 |
| 3,812,616 | 5/1974 | Koziol | 47/17 |

FOREIGN PATENT DOCUMENTS

| | | | |
|---|---|---|---|
| 1,209,542 | 3/1960 | France | 47/17 |
| 648,084 | 10/1962 | Italy | 52/86 |
| 24,397 | 3/1914 | Norway | 52/86 |

OTHER PUBLICATIONS

*Rubatex* Sweet's Catalog Service, 1962, Section 8b/Ru.
*Pointing Pipe Stakes*, Popular Mechanics, Mar. 1958, p. 218.

*Primary Examiner*—Ernest R. Purser
*Assistant Examiner*—Henry Raduazo
*Attorney, Agent, or Firm*—Roy E. Mattern, Jr.

[57] ABSTRACT

Greenhouse or storage structures in several embodiments of different sizes are capable of being mass produced in major subassemblies and then shipped knocked down and flat to a final erection site. Then they are erected in a matter of minutes by one person in respect to smaller ones and in less than two hours by two persons in respect to larger ones. Each greenhouse has a combined wall and roof assembly comprised of semi-rigid sheet material, generally fiberglass, originating in a rectangular shape. Using respective jigs, these rectangular sheets are laid over and fastened to several spaced and parallel pieces of flexible plastic conduit, which serve jointly as wall and roof reinforcements or supports. These flexible plastic reinforcements are aligned transversely to the longitudinal axis or each greenhouse. They also extend beyond the edges of the fiberglass sheet on both sides. At an erection site this roof and wall assembly is arched until the ends of the reinforcements or ribs are pointing downward and they are then inserted and fastened in receiving holes or secured clamps along respective opposite sides of a rectangular rigid base frame defining the floor area of the greenhouse. This base frame is anchored to the ground by driving in steel pipe anchor pins which acquire flared tops as they are driven into the ground. Two rigid, arch shaped, end frames utilizing the semi-rigid fiberglass sheet material, finally determine the arched shape of the combined wall and roof assembly as they become the enclosing ends of the greenhouse.

On large greenhouses access to such walk-in sized structures is through a doorway pre-built into one of the end frames. The door itself is often a conventional aluminum storm door assembly, and the balance of the framing is wood or aluminum. In a smaller size greenhouse access is provided by having an upper hinged base frame secured to a lower base frame, and the tilting of the upper hinged base frame also tilts the roof and end walls as a unit. Then they are propped open to provide ready access to the earth otherwise covered by the smaller greenhouse.

Another embodiment utilizes a smaller sized greenhouse, which is tilted about hinges secured to a low wall structure. Access through at least one low wall is provided, so upon tilting or pivoting the arched roof and the walls of the smaller sized greenhouse as a unit about the hinges, substantially full walk in access is provided to plantings arranged on shelves around the interior of the low wall structure.

8 Claims, 15 Drawing Figures

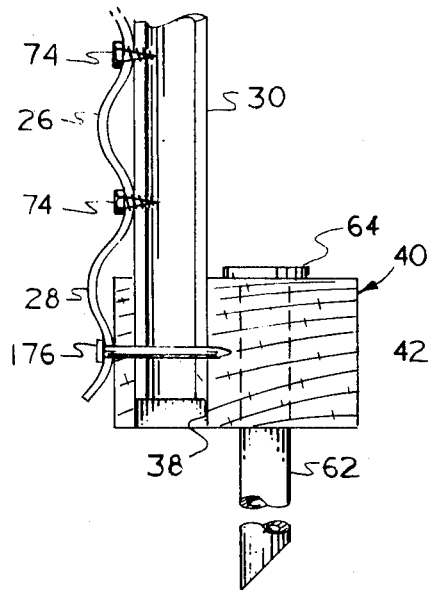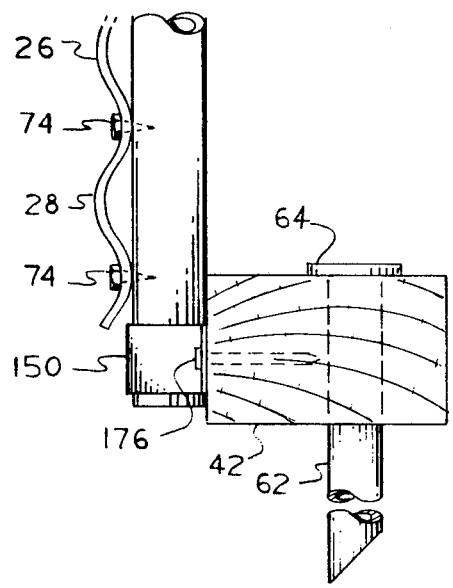
FIG. 7  FIG. 8
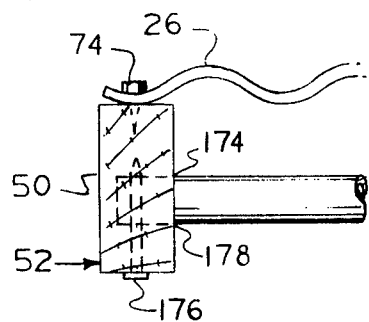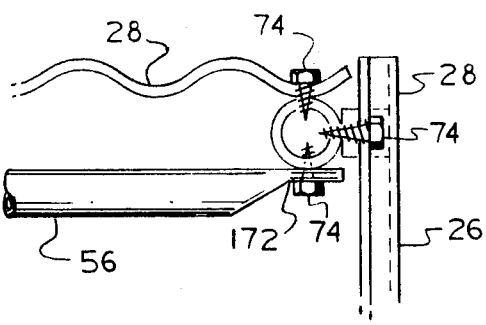
FIG. 9

SIMPLIFIED GREENHOUSE STRUCTURE SUITABLE FOR MASS PRODUCTION AND FIELD ASSEMBLY

BACKGROUND OF THE INVENTION

Building structures particularly adapted for use as greenhouses, have been erected as temporary or semi-permanent protective enclosures for plants and flowers and other things. Such previous structures were and are normally built by first erecting a framework which is then covered by plastic sheets. Numerous fasteners for attaching the plastic and various framework constructions have been devised.

In reference to some structures shown in patents, the protective cover disclosed by Mr. Commisso in his U.S. Pat. No. 3,088,244 utilizes archable support members to erect a housing from flat, easily shipped components, as does the present invention; however, Mr. Commisso's protective cover does not have the structural strength to be used in larger or more permanent embodiments. The greenhouse described by Mr. Leskinen in his U.S. Pat. No. 3,346,991 is a more permanent structure requiring the manufacture of expensive laminated wooden arches, and ribs are required to attach the plastic covering material. Similarly, the greenhouse structure in Mr. Gahler's U.S. Pat. No. 3,791,076 requires a complicated metal frame structure with clamping means for attachment of a plastic covering.

Although many previous greenhouses and like structures were available, a demand still remained for a shelter structure such as a greenhouse which could be manufactured, shipped, stored, in knock down assemblies and be assembled more rapidly and involve less overall expense than any previous temporary, semi-permanent or permanent buildings, while remaining structurally strong in all extreme weather conditions, and during all working conditions.

The invention fulfills this demand. In various embodiments, all are useful as greenhouses, and all are prefabricated in flat, planar sub-assemblies which are economically manufactured often on an assembly line basis using jigs. The planar sub-assemblies may be transported to a construction site, for example, on a farm or nursery, where two men are able to rapidly assemble and complete the building structure, using only hand tools. The utilization of corrugated fiberglass, available in transparent, translucent, or opaque grades for roof, wall and end exteriors, and attachment to plastic conduit, using self tapping screws, results in very efficient manufacturing and construction methods. Throughout the greenhouse, standard, available materials are used, being fabricated, assembled and erected using standard regular small tools.

With these materials in place on the jig, an electric drill with an adapter is powered to drive self-tapping sheet metal screws through the fiberglass panels and on into the plastic conduits or pipes. Preferably these self-tapping sheet metal screws, which are inserted as fasteners, have a hexagonal head with a definite stop-like shoulder at the bottom of the head to indicate the completed insertion when using an electric power drill with the appropriate size hexagonal socket adapter.

The respective base frames are generally made of solid wood, and plywood, and commercially available metal gussets are used at the corners to give the base rigidity. Wood screws or nails are used as fasteners for the base. Either holes are drilled near the outer edges of the two side based members, or pipe straps are installed to receive the ends of the roof-wall plastic support conduits or pipes which are inserted vertically into drill holes or pipe strap holes. Additional holes are provided around the perimeter of the base for anchor stakes when the base is to be placed directly on the ground.

SUMMARY OF THE INVENTION

There are needs for durable, simplified, inexpensive greenhouses which may be mass produced on an assembly line into flat units, or subassemblies which are easily shipped at a comparative lower cost, and thereafter easily assembled at a final erection site. These greenhouses, when manufactured according to the described methods, to the specified configurations, and shipped flat, and then quickly erected following the designated methods fulfill these needs. As so made, shipped and erected, these greenhouses may also serve as a work room, a storage facility, etc. The overall sizes may be varied to suit various purposes, ranging from a small lift off cover embodiment to a walk in embodiment.

Each greenhouse embodiment is designed to be field assembled from several subassemblies which may be mass produced in a factory and shipped by land, sea, and air, to an erection site in an overall flat configuration. At the erection site, the light weight prefabricated subassemblies of the greenhouse are easily assembled by two persons. The techniques of assembly are simple, and a relatively inexperienced person may quickly perform the final assembly of the arched roof greenhouse.

In each embodiment, there are four major subassemblies: the roof-wall subassembly, the base frame subassembly, and two enclosing end subassemblies. The roof is made by laying down lengths of flexible plastic conduit or pipe, such as polyvinylchloride (PVC) water pipe, on a jig, as they are spaced apart and held parallel. Preferably they are precut to length to form the transverse roof and wall support arches and to extend a few inches beyond the lower edges of the roof-wall subassembly. Then the outer surface structure of the greenhouse is laid over the pipes in a rectangular or square pattern. The outer surface structure is preferably corrugated and derived from a semi-rigid plastic material, such as fiberglass. Transparent, translucent, or opaque grades of fiberglass are selected with and without color, depending on the specific purpose for the greenhouse. Corrugated fiberglass material is generally chosen because of its strength, flexibility, ease of alignment, cost and availability. The ridges of the corrugated fiberglass make spacing of fasteners easy and help prevent incorrect alignment of the panels, because the corrugations normally run longitudinally on the fiberglass panels.

Regarding the various end subassemblies, all of them are made from the same fiberglass material that is used on the roof-wall subassembly. Most of these fiberglass end panels are securely fastened to the plastic pipe framing members with the preferred self-tapping sheet metal screws. On the larger greenhouse vertical wood columns are added to reinforce the end subassemblies and they are formed at the top to fit flush against the fiberglass roof-wall panels. Sheet metal screws are likewise used to secure the fiberglass end panels to these wood braces. When full length doors are used, they are generally aluminum storm doors. They are installed within a wooden frame which is braced horizontally with tubular steel members. One end of each tubular steel brace is inserted in a hole drilled in the door frame and secured with a nail. The other end of each tubular steel brace is secured by flattening one end of this tubing, and then pop riveting this flattened end to the plastic pipe or conduit which is placed around the perimeter of the end subassembly.

The four principal subassemblies: roof-wall subassembly, the two end subassemblies and the base subassembly are then shipped in their flat configuration to an erection site. There the base frame is placed in the desired location and anchored to the ground by inserting malleable steel stakes in appropriate holes in the perimeter of the base frame or through holes determined by pipe clamps. The stakes are made from steel pipe cut on a diagonal at one end. The top end flares out when the stakes are driven in and the resulting tops prevent the frame from raising up over the tops of these unique stakes finally created as the driving occurs.

The roof panel is thereafter positioned by guiding the protruding pipe ends on one side of the roof-wall subassembly into the holes along one edge of the bottom frame. Then after bending the roof-wall subassembly into an arch the same guiding is done with the opposite side. On the smaller greenhouses the roof-wall assemblies must be forced into an arched shape. However on larger greenhouses as the individual installing the greenhouse stands in the center beneath the roof-wall panel and lifts it, the roof-wall panel assumes an arched shape essentially because of its own weight. Drilled holes in the wood base hold the roof-wall plastic pipe supports, or pipe clamps are fastened to the vertical outside edges of the wood base frame to receive these ends of the plastic pipe. Generally, the erection operations in installing a greenhouse may be performed by one person. The roof-wall subassembly is fastened to the base wood frame by first drilling horizontal holes through the bottom edge portions of the fiberglass roof-wall subassemblies, which overlap the outer edge of the wood base frame, and also drilling on into the plastic pipe ends when they are present. Thereafter a nail is driven into the hole to complete this edge attachment. The enclosing end subassemblies then are inserted below the arched roof-wall subassembly. Also the end subassembly has its peripheral plastic pipe ends inserted in receiving holes in the base frame. Thereafter each end subassembly is fastened into place by drilling down to install the self-threading sheet metal screws through the roof-wall subassembly and beyond into the plastic pipe that runs around the periphery of arched end assembly. Where columns are used in the larger greenhouse end subassemblies, they are nailed to the base frame. The fiberglass of the end subassemblies is also fastened with sheet metal screws to the base frame.

Preferably during this assembly, a commercially available strip of corrugated plastic foam sealer material, which matches the fiberglass corrugations, is inserted between the roof-wall subassemblies and the end subassemblies by the top of the perimeter pipe and it is held in place by placing it in the path of the self threading sheet metal screws. Also to complete the end sealing, another strip of plastic foam sealer material, without the corrugations, is sandwiched between the end subassemblies and the side of the perimeter pipe, and it is also held in place by placing it in the path of the self-threading sheet metal screws.

In a smaller embodiment of the greenhouse of less height than a door, access to the planting bed is accomplished by tilting the entire roof-wall subassembly and its two end subassemblies about a longitudinal hinge. This hinge in turn is secured to a pair of base frames. The top base frame is secured to greenhouse and the bottom base frame is anchored to the ground, so the greenhouse may be pivoted upwardly to gain access to the planting beds and to the plants.

In a third embodiment this ground level smaller embodiment of the greenhouse, with its tiltable roof-wall subassembly and with its two end subassemblies is secured to the top base frame of two base hinged frames, and together all these components are positioned on top of a subassembly of low spaced vertical sides and end walls. They are made of plywood and also reinforced by whole wood to form a lower enclosed surrounding base structure. In one vertical side wall a half door is installed to allow walk in access to the small interior of the greenhouse when the top is tilted back and propped open.

As manufactured, shipped, erected and sealed, in one or more of its embodiments, the greenhouse is ready for a long sustained useful life to aid in the growing of plants and flowers and/or to serve some other purpose to be carried on in such a low cost greenhouse structure. At all times it is ready to be quickly returned to flat subassemblies for movement to a new erection site.

DESCRIPTION OF THE DRAWINGS

Three embodiments of greenhouses are illustrated, all having many alike structural features.

FIG. 7 is a partial view of the lower side components of the larger greenhouse, indicating at this location the relative placement of the plastic pipe, fiberglass panel, the base frame, and the ground anchor, and also showing the use of the self-threading sheet metal screw with its abutting bolt head in securing plastic and fiberglass components together, and the use of nails when securing the fiberglass panels along their bottom to the wood base frame.

FIG. 8 is a partial view, similar to the partial view of FIG. 7 indicating the utilization of pipe straps positioned along the wood base frame to secure the plastic pipe ends, as it is generally done in assembling a smaller greenhouse.

FIG. 9 is a partial view illustrating how in the larger greenhouse aluminum tubing is formed and used as horizontal bracing between the door frame and the plastic pipe located as the support member at the periphery of the front subassembly.

DESCRIPTIONS OF PREFERRED EMBODIMENTS

Objectives With Respect to All Embodiments

By using the unique methods of making subassemblies wherein fiberglass panels are secured principally to plastic pipe, upon the driving rotation of bolt headed sheet metal screws, several embodiments of greenhouses are made available in flat shipment form for low cost storage and shipment to an erection site. Then upon assembly, the subassemblies are quickly and conveniently handled, often by one man, and final securement centers again on the driving rotation of bolt headed sheet metal screws which hold extremely well in the plastic pipe and other materials, creating durable greenhouses at comparatively lower overall costs.

A Walk In Greenhouse With a Full Size Entry Door

Figure 1:
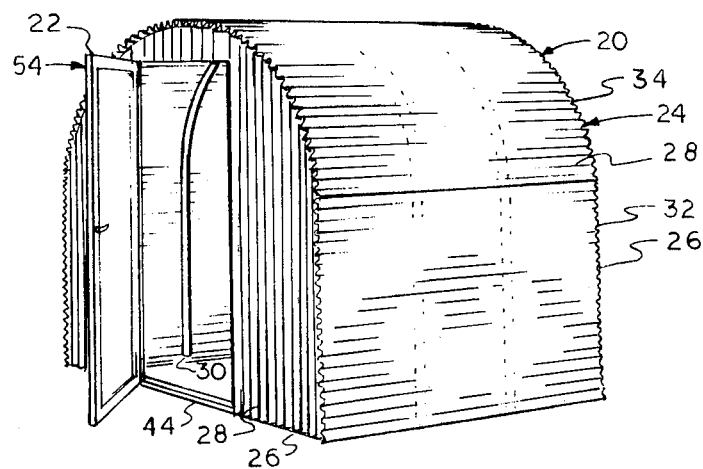
FIG. 1 shows in perspective, a walk in full height greenhouse.
Figure 4:
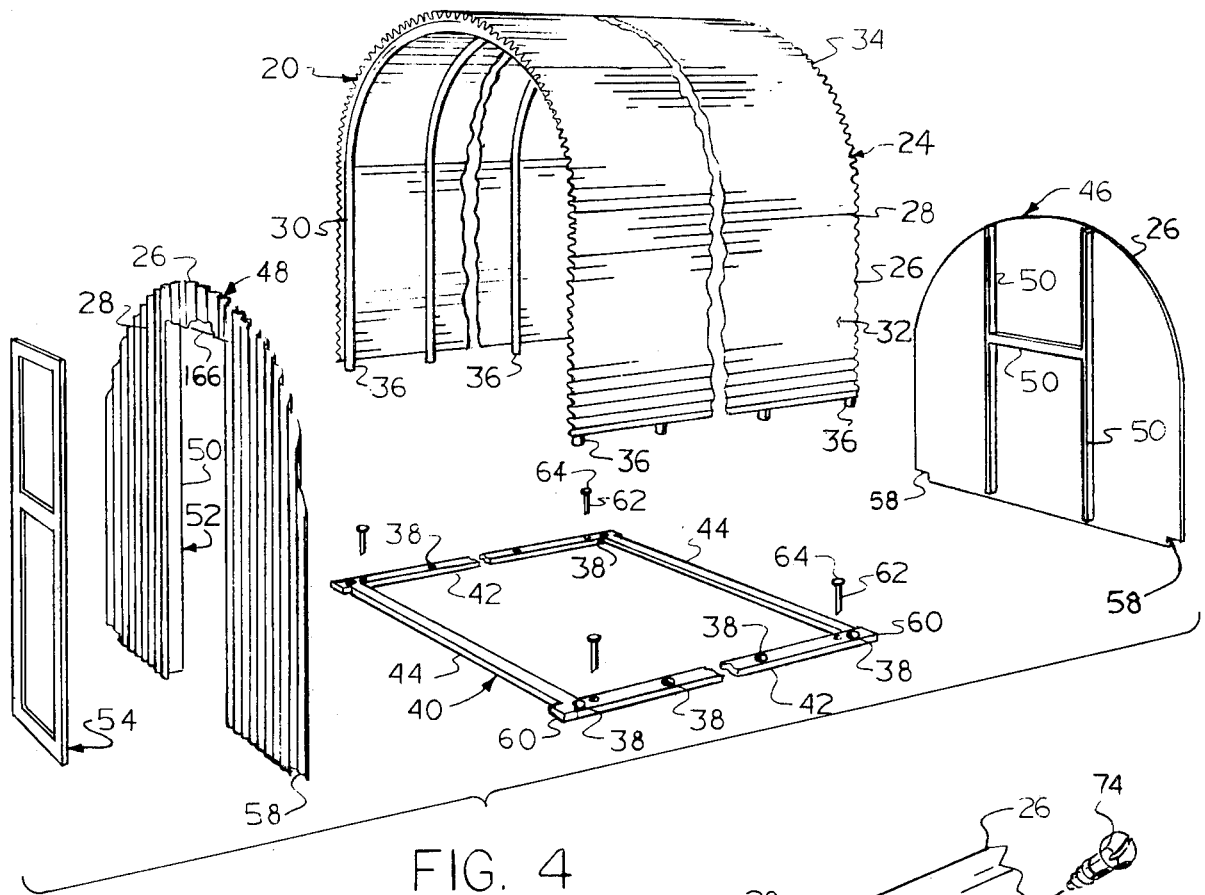
FIG. 4 depicts in an exploded view the related components of the full size walk in greenhouse, shown assembled in FIG. 1, the breakaway portions indicating selected variable lengths.

A walk in greenhouse 20 with a full size door 22 is shown in FIG. 1 as assembled, and in FIG. 4 in an exploded view. The combined roof and sidewall structure 24, hereinafter referred to as the roof-wall subassembly 24, is constructed of transparent corrugated fiberglass sheeting or panels 26 with longitudinally aligned corrugations 28, which are fastened to spaced transverse plastic pipes 30. They are preferably polyvinylchloride pipes 30 and they serve as the supports for the sidewalls 32 and roof 34. Upon assembly the ends 36 of these plastic support pipes 30 are placed in retaining holes 38 which are formed in a rectangular wood base foundation frame 40. This wood base foundation frame 40 is treated with impregnating solutions to prevent rotting and insect attack.

The longitudinal side members 42 of foundation frame 40 project slightly beyond their intersection with the transverse end members 44 of the foundation frame 40 to position and support the end subassemblies 46 and 48. The closed end rear or back end subassembly 46 is made of transparent corrugated fiberglass sheeting or panels 26, with vertically aligned corrugations 28, and it is reinforced by using vertical wood studs 50. The front end subassembly 48 is also made of transparent, corrugated fiberglass sheeting or panels 26, with vertically aligned corrugations 28, and it is reinforced by vertical wood studs 50, which also serve as a door frame 52 for a commercially available standard size aluminum storm door subassembly 54. This door subassembly 54 includes a door, hinges, a closing mechanism, and a latch which are not specifically illustrated. Horizontal mid-door height horizontal braces 56 made of aluminum tubing are installed on either side of the door frame 52. The back and front subassemblies 46, 48 have notches 58 formed at their lower corners to fit over the extending ends 60 of the longitudinal side members 42.

The entire greenhouse 20 is anchored to the ground by using steel pipe stakes 62 which are driven down through anchor holes 66 formed in the perimeter of the wood base foundation frame 40. Upon being driven flared tops 64 are formed on the stakes 62.

Figure 5:
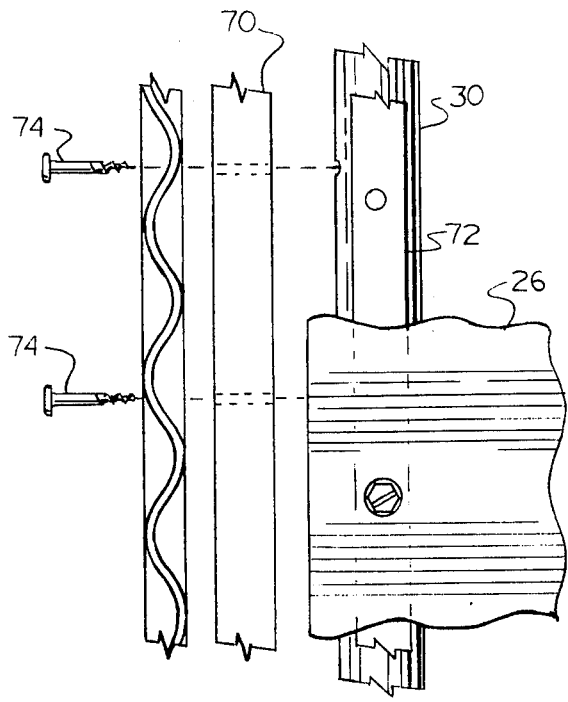
FIG. 5 is a spaced apart partial view of the joining and sealing components located at the ends of these greenhouses, indicating the placement of the two weather seals.
Figure 6:
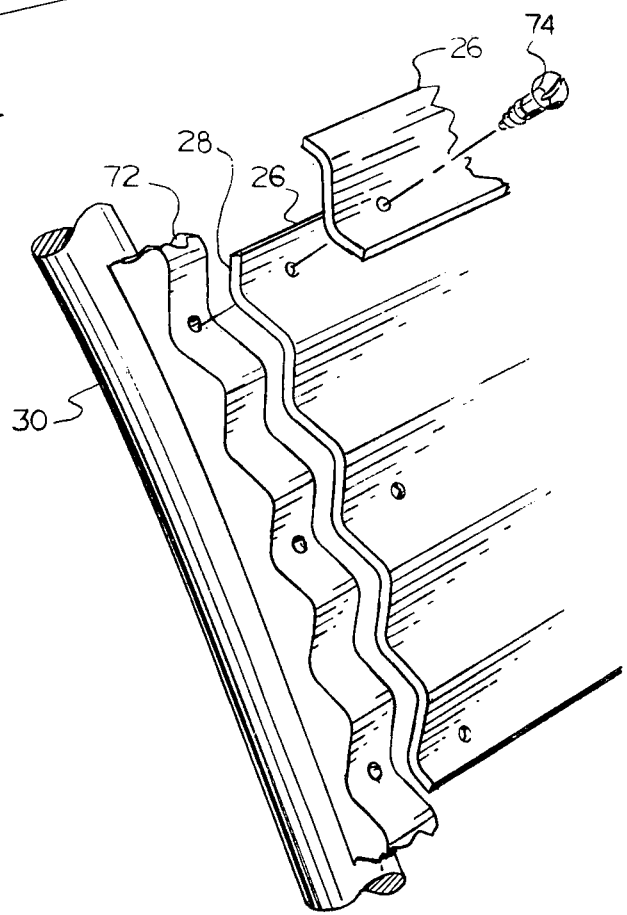
FIG. 6 is another spaced apart partial view of the joining and sealing components located at the ends of these greenhouses, indicating the placement of one of the two weather seals.

The intersections of the roof-wall subassembly and end subassemblies are sealed with preformed foam plastic strips 70, 72, which serve as seals. Although not illustrated in FIG. 1, these seals 70, 72 are shown in FIGS. 5 and 6. The end sealing strip 70 is of rectangular cross-section and upon assembly of the greenhouse 20, it is sandwiched between the fiberglass of the end subassemblies 46 and 48 and the respective plastic support pipes 30 located immediately adjacent to these end subassemblies 46 and 48. This seal 70 is held in position by the self-tapping sheet metal screws 74 which are used to fasten the fiberglass of the end subassemblies 46, 48 to the roof-wall plastic support pipes 30. To complete the overall sealing at these same locations another commercially made plastic foam seal strip 72, somewhat similar to the sealing strip 70, except one upper face 76 is molded to conform to the corrugations 28 in the cross-section of the fiberglass 26, is sandwiched between the roof-wall subassembly 24 and the same roof-wall plastic support pipes 30 at locations immediately adjacent to the end subassemblies 46 and 48, and the other sealing strips 70. This sealing strip 72 is likewise held in place by the self-tapping sheet metal screws 74.

A Lift Off or Pivot Up Small Greenhouse

Figure 2:
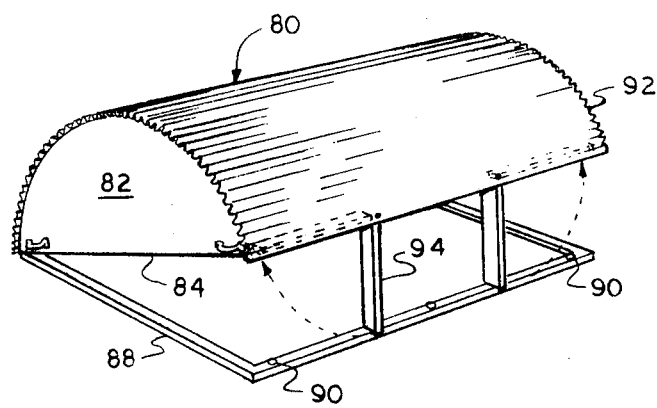
FIG. 2 indicates, in perspective, a smaller lift off or pivot up greenhouse for placement on the ground, the greenhouse being shown pivoted upwardly and propped up for low access to the planting soil and to the plants.

A lift off or pivot up small greenhouse 80 is illustrated in FIG. 2. It has a tilt base access rather than a door access, or being small it may be lifted off completely when planting. The end subassemblies 82 are identical and formed of a fiberglass panel 26 which is secured to plastic pipe 30 with sheet metal screws 74. A wood upper base frame 84 is attached by hinges 86 along one side to one side of a wood lower base frame 88, which is identical in size, and may have holes 90 to accommodate steel pipe anchoring stakes 62. Access to the interior of this small greenhouse 80 is gained by tipping up the roof-wall subassembly 92 and the end subassemblies 82, as shown in FIG. 2, as a lifting force is applied on the upper base frame 84 on its side opposite to its side having hinges 86. Or when the initial ground planting occurs or the final harvest occurs, this entire greenhouse 80 is small enough to be completely lifted off. A pivotal strut 94 is used to keep the upper and lower base frames 84, 88 pivoted apart during access or cooling periods.

Figure 3:
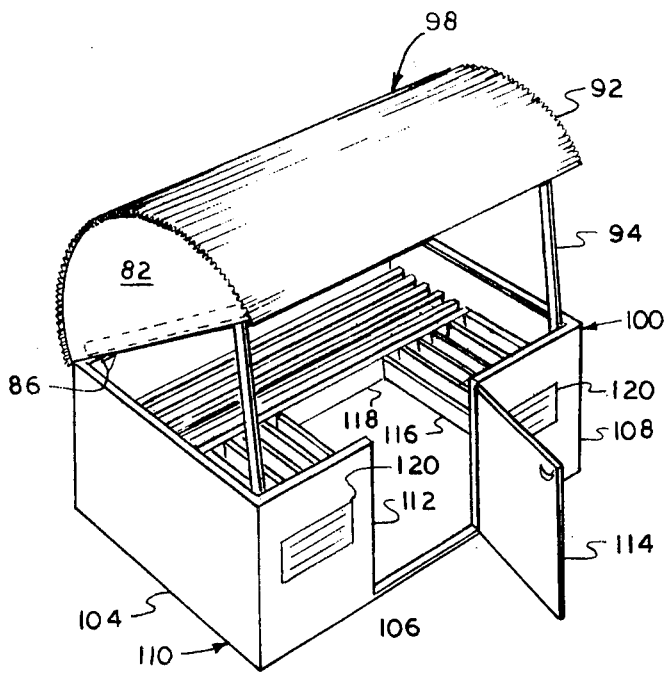
FIG. 3 illustrates, in perspective, a smaller lift off or pivot up greenhouse secured to a lower enclosed surrounding low wall base structure generally made of plywood and having an access door portion, the top of the greenhouse being shown pivoted upwardly and propped up for higher access, via the access door portion, to the inside planting volume.

A Pivot Up Small Greenhouse Serving as Additional Wall and Roof Structure of a Low Wall Wood Structure for Walk in Plant Care Operations A pivot up small greenhouse 98 is pivotally secured to a low wall wood structure 100 as shown in FIG. 3. Its wood upper base frame 84 is pivotally secured to the top of back wall 102 of the low wall structure 100 using hinges 86. It has no lower base frame, for back wall 102, side walls 104 and the partial front walls 106, 108 serve the function of a lower base frame. The balance of the small greenhouse 98 is made like small greenhouse 80. After tilting up greenhouse 98, final walk in access to this overall small greenhouse 110 is through the door opening 112 served by door 114, located between the partial front walls 106 and 108. Strips of wood 116 secured together as shelves 118 are constructed inside the low wall structure 100 to support plants or other foliage, at a convenient level, where a gardener may stand on his or her feet inside this greenhouse while working on these plants. The space underneath the shelves 118 may be used for storage. Vents 120 are built into the partial front walls 106, 108 to permit air circulation to and from the overall greenhouse 110. At selected locations the walls 102, 104, 106, 108, generally made of plywood are joined together and/or strengthened by using solid wood pieces 122.

Figure 10:
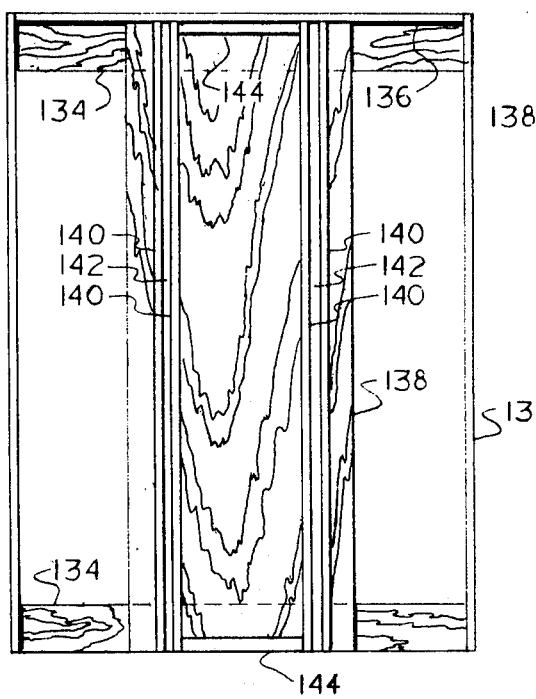
FIG. 10 is a top view of the jig used in making the roof-wall subassembly of a smaller greenhouse.
Figure 11:
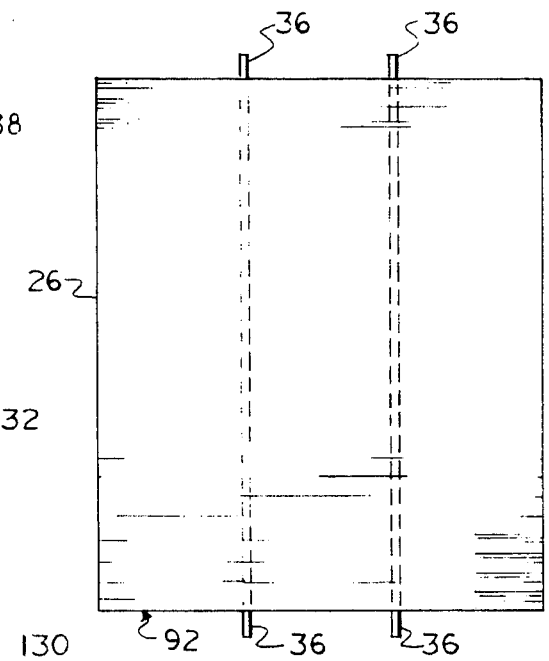
FIG. 11 is a top view of the roof-wall subassembly in its preliminary flat configuration, after being removed from the jig illustrated in FIG. 10.
Figure 12:
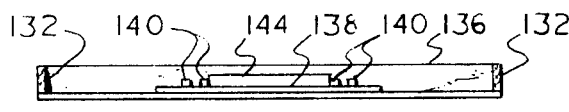
FIG. 12 is an end view of the jig illustrated in FIG. 10 which is used in making the roof-wall subassembly.
Figure 13:
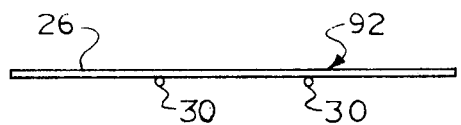
FIG. 13 is an end view of the roof-wall subassembly.

Preferred Methods of Construction of These Greenhouse Subassemblies The Roof-Wall Subassembly of a Small Greenhouse The roof-wall subassembly 92 shown in FIG. 11 is fabricated in a flat configuration in a roof-wall subassembly jig 130 as shown from the top in FIG. 10 and from the end in FIG. 12. The wood jig 130 is constructed with two vertical side boards 132 aligned in parallel and then secured on the bottom at both ends by horizontal cross braces 134 and also on one end by a vertical cross brace 136. A wood sheet 138 is positioned in the center between the two side boards 130, to lie flat on top of the horizontal cross braces 134 and to be secured to them. Then two sets of pairs of thin parallel guide strips of wood 140 are fastened on top of the wood sheet 138, each pair of strips 140 define a receiving slot 142. Between the inner two strips 140 and parallel to the horizontal cross bracing 134 are two vertical toe boards 144, one at each end of this jig 130.

Using this roof-wall subassembly jig 130, the roof-wall subassembly 92 is fabricated into a flat subassembly as follows. The roof-wall plastic support pipes 30 are cut in length to match the receiving slots 142 and then they are dropped into these slots 142, where they are held in place during the subassembly operation. The fiberglass roof-wall sheeting or panel 26 is then cut to size and laid in the jig on top of the plastic pipes 30 with the corrugation ridges 28 and valleys running perpendicular to the plastic support pipes 30. This roof-wall panel 26 is held in place by the jig vertical side boards 130 and the vertical toe boards 144. The fastening points may be predrilled with small diameter drills to prevent cracking and the corrugations 28 facilitate the alignment and spacing of the selected fastening points. Self-tapping sheet metal screws 74 having shouldered, hexagonal bolt-like heads are rotatably driven initially or later in the pilot holes using a power driven hexagonal socket rotatably held in a drill. The shoulder on the screw head serves as an abutment to indicate the stopping of the drilling and the sheet metal screw thereafter securely holds the fiberglass panel 76 and plastic pipes 30 firmly together. The overall jig design assures the proper extension of the roof support plastic pipes 30 beyond the edges of the roof-wall subassembly 92 for their later securement to a base frame such as shown in FIG. 8.

Although the manufacture of the roof-wall subassembly 92 of a small greenhouse 80 has been illustrated and described in reference to FIGS. 10, 11, 12 and 13, the same basic approach is used in the manufacture of the roof-wall subassembly 24 of the walk in greenhouse 20. There will be more components to accommodate several additional plastic pipe supports.

The wood upper base frame 84 and wood lower base frame 88 are also made in a jig. Their assembly, in some measure, is indicated by the following description of the making of the wood base foundation frame 40 of the walk in greenhouse 20.

The Rectangular Wood Base Foundation Frame for the Walk in Greenhouse

As indicated in FIG. 4, the rectangular wood base foundation frame 40 of the walk in greenhouse 20, is initially prefabricated without one of its transverse end members 44, which instead is initially associated with the prefabrication of the front end subassembly 48. Therefore as shown the longitudinal side base members 42 are prejoined in a jig, not shown, with just one transverse base end member 44 to form a block "U" shaped wood base foundation partial frame. The longitudinal side base members 42 protrude slightly beyond the bottom of the block "U" to later receive portions of the rear or back end subassembly 46.

Receiving holes 66 are drilled in this block "U" portion of the base foundation frame 40 to later receive the extending lower ends 36 of the plastic support pipes 30, as illustrated in FIG. 7. As noted in FIG. 8, pipe clamps 150 preferably used in manufacturing smaller greenhouses, could also be used in making larger greenhouses to hold the plastic pipe ends 36, in lieu of their positioning in receiving holes 66.

The rectangular wood base foundation frame 40, as are all wood parts used throughout all embodiments, is treated with solutions commercially available to prevent and/or delay decay and insect distruction. Overall production arrangements may be altered to accommodate all metal construction in lieu of the wood components. However, the advantages of the fiberglass panel and plastic pipe subassemblies held together by bolt headed self-tapping sheet metal screws will be retained as these materials will continue to be used.

The Entry or Front End Subassembly of the Walk In Greenhouse

Figure 14:
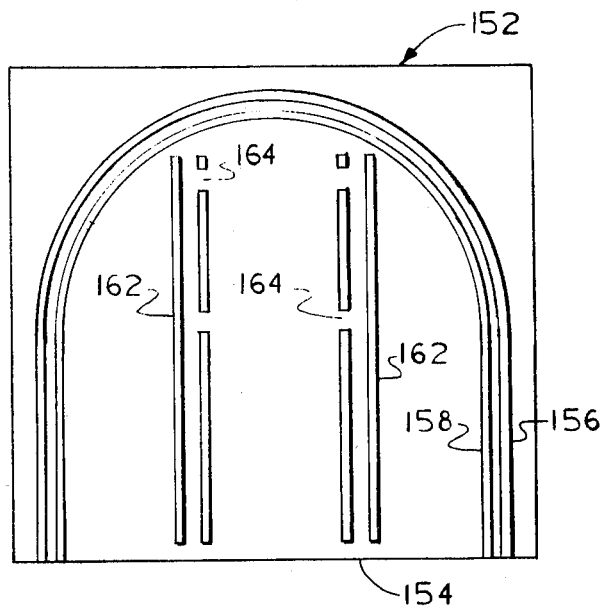
FIG. 14 is a top view of the jig used in making the end subassemblies of a larger greenhouse.
Figure 15:
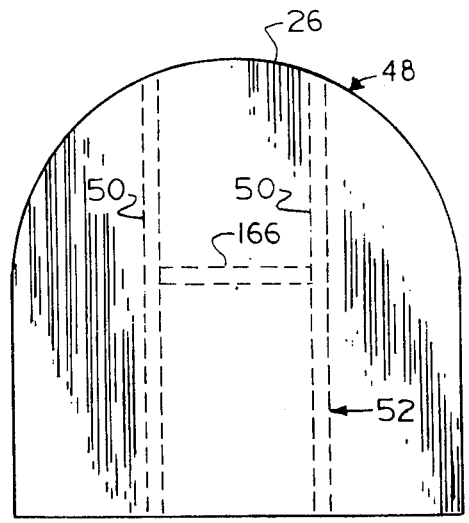
FIG. 15 is a view looking down on the partially completed door end subassembly after being removed from the jig illustrated in FIG. 14.

The entry or front end subassembly 48 of the walk in greenhouse 20 is preassembled in part into a flat shippable configuration for transport to an erection site by using the entry or front end jig 152, illustrated in FIG. 14, to produce the preassembly 154, shown in FIG. 15. A plywood base 154 of this jig 152 receives an upstanding curved plywood strip 156 braced by spaced backing blocks 158 located on the exterior of the curve, as the interior of the curved plywood strip 156 is shaped to receive a plastic support plastic pipe 30, which will subsequently upon erection also support the end of the roof-sidewall assembly 24. This arched shape is also the vertical cross-section of greenhouse 20 at the outer edge of these roof support plastic pipes 30. Inside the curved plywood strip 156, and spaced the width of the roof support plastic pipes away from the arched strip 156, several plastic pipe guide blocks 160 are spaced and secured to the base 154 of this entry or front end jig 152. Located within the arch and arranged perpendicular to the base of the arch, pairs of wood strips 162 are fastened to receive combined stud 50 and door frame members 52. The inner strips 162 are formed to create gaps 164 which are both the width of the top horizontal member 166 of the door frame 52. The transverse end member 44 eventually completes the door frame 52. The bottom end of these strips 162 are spaced the thickness of the base transverse end member 44 from the edge of the base sheet 154 at the base of the arch, also designated as the base of the entry end subassembly 48.

Into this entry or front end subassembly jig 152, vertical studs 50 and horizontal member 166 are cut to length and placed in the slots formed by the pairs of wood strips 162 to create door frame 52. Also the front transverse end base member 44 is placed in the jig 152. The studs 50 are notched at their upper ends to later accommodate the roof support plastic pipe 30. Then a roof support plastic pipe 30 is laid upon its bending after being cut to length to match the inside of the arched wood strip 156. The pipe guide blocks 160 hold the inserted and curved plastic pipe 30 in place. Then a fiberglass sheet or panel 26 is cut to the arched shape, and trimmed to receive a door, and notched in the lower corners and has its corrugations running perpendicular to the base of the arch. When so formed it is laid over the roof support plastic pipe 30 and readied to be fastened with bolt head self-tapping sheet metal screws 74, in a manner similar to that used on the roof assembly. First, however the end plastic foam sealing strip 70 is interposed, as shown in FIG. 5 to be also secured by these screws 74. The fiberglass sheeting 26 with the attached roof support pipe is also secured to the studs with the sheet metal screws. Then nails are driven from outside through pre-drilled holes, into the roof ends of the studs after first passing through the plastic sheeting, plastic pipe to complete this prefabrication of the entry or front end assembly 48 of the walk in greenhouse 20. The rear end preassembly 46 might be made using this same jig 152. However in making one embodiment of a walk in greenhouse a jig, not shown, is used and three evenly spaced studs 50 of different lengths are positioned across the rear end assembly 46. When the rectangular wood base foundation frame 40 is initially made in a block "U" shape including the rear transverse base end member 44, then the rear end preassembly 46 is made without such a transverse member.

After the entry end presubassembly 48 is removed from the jig 152, two horizontal thin wall aluminum or steel tubing braces 56 are installed to brace both sides of the door frame 52, as illustrated in FIG. 9. The inside tube ends 72 are inserted into respective horizontal receiving holes 174 in the door frame 52 in respective vertical studs 50 and retained by driving a nail 176 both through the door frame 52 and the end 172 of the tube 56, after first preferably predrilling an undersize nail guiding hole. The opposite end 178 of the tube 56 is first flattened and then fastened to the roof support plastic pipe 30 with a pop rivet 180. This entry or front end subassembly 48 is then ready for storage, shipment and eventually final erection at the installation site. This subassembly 48 and the other three subassemblies of a walk in greenhouse may be shipped in their flat configurations to the final assembly site. Also the four assemblies or more of the smaller greenhouses may be shipped flat to the erection site.

Erection of the Walk In Greenhouse

In erecting the walk in greenhouse 20, the "U" shaped portion of the base subassembly 40 is anchored to the ground by driving in a preselected length of malleable steel pipe serving as a stake 62 which has been cut at an angle at its lower end 63. This resulting pointed end 63 is driven through the anchor holes 66 in the longitudinal side members 42 of the rectangular wood base foundation frame 40. The pounding causes the tops 64 of the stakes 62 to flare into a head like size, as illustrated in FIG. 7, to thereby very adequately secure the base frame 40 to the ground. The roof-wall subassembly 24 is curved into an arch by a person lifting it up as he raises it to eventually stand underneath this subassembly 24. When so formed, then the ends 36 of the roof support plastic pipes 30, first on one side, then on the other, are inserted into the receiving holes 66 in the longitudinal side members 42 of the base frame 40. The roof-wall subassembly 24 is secured by driving nails 176 horizontally through the corrugated fiberglass sheeting panels 26, on through the longitudinal side members 42 and when so aligned on through the lower ends 36 of the roof support plastic pipes 30. The entry or front end subassembly 48 is then installed beneath the curved arch of the roof-wall subassembly 24 as its ends 36 of its roof support pipe 30 are inserted into the receiving holes 66 in the base frame 40. The foam sealer strip 72 is wedged inbetween the roof-wall fiberglass sheeting 26 and the plastic roof support pipe 30. This sealer strip 72 is fastened in place when other components are secured together with self-tapping screws 74 rotatably driven through the roof-wall fiberglass sheeting 26, on through the sealer strip 72, and beyond into the plastic roof support pipe 30, as shown in FIGS. 5 and 6. The rear, back or closed end subassembly 46 is installed beneath the curved arch of the roof-wall subassembly 24 in the same manner as occurred in installing the entry end subassembly 48 thereby erecting the greenhouse 20 which is thereafter finally closed upon the installation of the aluminum storm door assembly 54.

Although in the larger models, the roof of the greenhouses subassembly will assume its arched shape when lifted in the center because of its own weight, in handling the smaller models of greenhouses these roof-wall subassemblies must be somewhat forcibly bent into an arch. Thereafter the ends 36 of the plastic support pipes 30 are firmly held in place along a base frame 80 by using pipe clamps 150, as shown in FIG. 8. The pipe clamps 150 are only loosely secured until the roof-wall subassembly 92 is in place, then they are tightened to securely clamp the lower ends 36 of the plastic roof support pipes 30 in place. This method of assembly is considered to be better in erecting small greenhouses, in contrast to the use of retainer holes 66 when erecting walk in greenhouses.

SUMMARY OF ADVANTAGES

This invention permits the preconstruction and preassembly and final erection of greenhouses both large and small from readily obtainable materials which are workable with common tools requiring no special skills during the fabrication and erection. The materials utilized are durable. The overall design lends itself to both mass production or single end unit construction methods. Moreover the subassembly designs and manufacturing methods are utilized, so the subassemblies may be shipped to respective distribution centers and to erection sites in several major components which remain flat for convenient handling, storage and shipping. The final erection of each greenhouse, small or large, may be accomplished by one person in a matter of minutes using only a few standard tools requiring no special skills to operate them or to assemble the subassemblies of the selected greenhouse.

Once in place each embodiment of the greenhouse, serving its market and use objective, remains well installed for a long period of effective use. Throughout all embodiments there is the effective use of fiberglass panels and plastic pipe joined with the firmly holding bolt headed sheet metal screws, which are self-threading upon installation. When a new erection site is selected, transfer of the greenhouse, either assembled or disassembled into flat subassemblies, is readily and conveniently undertaken. Throughout the entire periods, from manufacture, storage, shipment, erection, use and possible relocation, lower costs are always fully realized.

I claim:

1. A greenhouse, rapidly made in initially flat subassemblies, preferably at a factory site, then easily handled and transported to an erection side, while flat, and then rapidly arranged and rapidly erected by one person, the manufacture and erection being undertaken while using conventional materials and only standard hand held tools, comprising:
   a. a roof and sidewall subassembly, manufactured and shipped as a flat, unitary structure, to be manually flexed into an arched protective weather cover at the greenhouse construction site, comprising in turn a continuous flexible sheet of corrugated fiberglass, with the corrugations arranged longitudinally, and a plurality of transverse, spaced, and parallel, flexible plastic pipes secured to the continuous fiberglass sheet by using self tapping screws;
   b. a planar base frame subassembly, defining the foundation perimeter of the erected greenhouse, to be positioned at the greenhouse construction site and to be secured to the ground and to retain the roof and sidewall subassembly as an arched protective weather cover; and
   c. planar end subassemblies, each comprising, a pre-flexed plastic pipe which also serves as the endmost arched plastic pipe support of the roof and sidewall subassembly, attached to a vertical sheet of corrugated fiberglass having the corrugations arranged vertically, and having an essentially horizontal bottom edge, and also having upper and side edges matching the curve of the arched plastic pipe, to thereby fit within the respective ends of the roof and sidewall subassembly after its securement to the planar base frame subassembly.

2. A greenhouse, as claimed in claimed in claim 1, wherein the flexible plastic pipes serving as spaced supports are constructed from polyvinylchloride water pipe and the self tapping screws used in securing the corrugated fiberglass sheet to the flexible plastic pipers are like those fasteners often referred to as sheet metal screws.

3. A greenhouse, as claimed in claim 2, wherein the flexible plastic pipes extend at each of their ends beyond the edges of the corrugated fiberglass sheet of the roof and sidewall subassembly and the planar base frame subassembly has receivers to hold these extending ends of the flexible plastic pipes to retain the roof and sidewall subassembly as an arched protective weather cover.

4. A greenhouse, as claimed in claim 3, wherein a door assembly is installed in one of the planar end subassemblies.

5. A greenhouse, as claimed in claim 4, wherein vertical reinforcing members are secured to the planar end subassemblies.

6. A greenhouse, as claimed in claim 45, wherein performed plastic foam sealing strips are placed at each end of the greenhouse respectively on top and alongside the outside of the respective pre-flexed plastic pipes which serve as a support for both the roof and sidewall subassembly and the respective planar end subassemblies.

7. A greenhouse, as claimed in claim 6, wherein stakes are driven through holes made in the planar base frame subassembly to secure the greenhouse to the ground.

8. A greenhouse, as claimed in claim 7, wherein the stakes are lengths of steel tubing having lower diagonally cut ends for convenient ground penetration and having tops flared, upon driving them in, to thereby entrap the planar base frame subassembly, keeping it at ground level.

* * * * *